US008621161B1

(12) United States Patent
Briggs

(10) Patent No.: US 8,621,161 B1
(45) Date of Patent: Dec. 31, 2013

(54) MOVING DATA BETWEEN DATA STORES

(75) Inventor: Gregory J. Briggs, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 507 days.

(21) Appl. No.: 12/888,731

(22) Filed: Sep. 23, 2010

(51) Int. Cl.
*G06F 12/00* (2006.01)

(52) U.S. Cl.
USPC ............ 711/152; 711/117; 711/156; 711/162

(58) Field of Classification Search
None
See application file for complete search history.

(56) References Cited

U.S. PATENT DOCUMENTS

| | | | |
|---|---|---|---|
| 5,313,629 A | 5/1994 | Abraham et al. | |
| 5,893,117 A | 4/1999 | Wang | |
| 6,615,219 B1 | 9/2003 | Bruso et al. | |
| 7,047,242 B1 | 5/2006 | Ponte | |
| 7,257,592 B2 | 8/2007 | Dinh et al. | |
| 7,734,539 B2 | 6/2010 | Ghosh et al. | |
| 2002/0073110 A1 | 6/2002 | Duvillier et al. | |
| 2003/0196147 A1 | 10/2003 | Hirata et al. | |
| 2004/0139097 A1* | 7/2004 | Farber et al. ............. | 707/100 |
| 2004/0220940 A1 | 11/2004 | Berks et al. | |
| 2004/0267831 A1 | 12/2004 | Wong et al. | |
| 2005/0071349 A1 | 3/2005 | Jordan et al. | |
| 2005/0138375 A1 | 6/2005 | Sadjadi | |
| 2005/0138401 A1 | 6/2005 | Terao et al. | |
| 2005/0160481 A1 | 7/2005 | Todd et al. | |
| 2006/0047658 A1 | 3/2006 | Baird et al. | |
| 2006/0282457 A1 | 12/2006 | Williams | |
| 2007/0006209 A1 | 1/2007 | Nguyen et al. | |
| 2007/0198979 A1 | 8/2007 | Dice et al. | |
| 2008/0005151 A1 | 1/2008 | Iwakura | |
| 2009/0063465 A1 | 3/2009 | Ferragina et al. | |
| 2009/0094298 A1 | 4/2009 | Bondurant et al. | |
| 2010/0082553 A1 | 4/2010 | Beatty et al. | |
| 2010/0088676 A1 | 4/2010 | Yuan et al. | |
| 2010/0106734 A1 | 4/2010 | Calder et al. | |
| 2010/0114853 A1 | 5/2010 | Fisher et al. | |
| 2010/0185597 A1 | 7/2010 | Dunn | |
| 2010/0185621 A1 | 7/2010 | Klein | |
| 2012/0011178 A1 | 1/2012 | Pfeifle et al. | |

OTHER PUBLICATIONS

Non-Final Office Action for U.S. Appl. No. 12/870,661, mailed on Jun. 1, 2012, Gregory J. Briggs et al., "Multi-blob Consistency for Atomic Data Transactions", 27 pages.

Non-Final Office Action for U.S. Appl. No. 12/870,405, mailed on Jul. 26, 2012, Gregory J. Briggs et al., "Sub-containment Concurrency for Hierarchical Data Containers", 25 pages.

(Continued)

*Primary Examiner* — Shawn X Gu
(74) *Attorney, Agent, or Firm* — Lee & Hayes, PLLC

(57) ABSTRACT

A data object may be moved from a source data store to a destination data store via replication. The replication is initiated when an original data object in a source data store that is capable of being both read from and being written to is read. Following the read, the original data object is then duplicated to a destination data store. The duplicate data object is provided with a state that indicates the duplicate object is duplicated from the source data store and can be read but cannot accept a data write. Subsequently, the state of the original data object is changed to can be read but cannot be written to using optimistic locking. Further, the state of the duplicate data object is also modified to being capable of both read from and written to with the use of optimistic locking. The replication is completed with the deletion of the original data object from the source data store.

37 Claims, 11 Drawing Sheets

(56) References Cited

OTHER PUBLICATIONS

Office action for U.S. Appl. No. 12/870,587, mailed on Sep. 19, 2012, Briggs et al., "Transactionally Consistent Indexing for Data Blobs", 21 pages.

Non-Final Office Action for U.S. Appl. No. 12/870,531, mailed on Mar. 2, 2012, Gregory J. Briggs et al., "Optimistically Consistent Arbitrary Data Blob Transactions", 18 pages.

Office action for U.S. Appl. No. 12/870,587, mailed on Apr. 23, 2012, Briggs et al., "Transactionally Consistent Indexing for Data Blobs", 20 pages.

Final Office Action for U.S. Appl. No. 12/870,661, mailed on Oct. 22, 2012, Gregory J. Briggs et al., "Multi-blob Consistency for Atomic Data Transactions", 15 pages.

Final Office Action for U.S. Appl. No. 12/870,531, mailed on Sep. 27, 2012, Gregory J. Briggs et al., "Optimistically Consistent Arbitrary Data Blob Transactions", 13 pages.

Office action for U.S. Appl. No. 12/870,405, mailed on Jun. 4, 2013, Briggs et al., "Sub-containment Concurrency for Hierarchical Data Containers", 27 pages.

Office action for U.S. Appl. No. 12/870,661, mailed on Jul. 15, 2013, Briggs et al., "Multi-blob Consistency for Atomic Data Transactions", 16 pages.

\* cited by examiner

MOVING DATA BETWEEN DATA STORES

BACKGROUND

A centralized consistent location service is a feature of a distributed data storage system. The consistent location service may be responsible for the coordination of data relocations between different data stores of the distributed data storage system. However, a distributed data storage system that uses a centralized consistent location service may need to frequently interact with the consistent location service during normal operation, thereby decreasing its operational efficiency. The maintenance of the consistent location service may also consume additional computing and technical support resources, thereby increasing the operational cost of the distributed data storage system. Additionally, any malfunction of the consistent location service may also detrimentally impact the operation of the distributed data storage system.

Moreover, a centralized consistent location service may not be present in a tiered data storage system. Generally speaking, a tiered data storage system stores data in different types of data stores based on access criteria, frequency of use, security concerns, and other factors. For example, important data of a business that are frequently accessed and updated in real time may be stored in the "first tier" data stores of tiered data storage system. The data stores of the "first tier" may reside on storage servers that provide the highest accessibility, durability and/or reliability. In contrast, less mission critical data of the business may be stored in the data store of a "second tier". The data stores of the "second tier" may reside on storage servers that are less robust and reliable. However, these storage servers may be less expensive to operate. Finally, historical or archival data of the business may be stored in the data stores of a "third tier". The data stores of the "third tier" may reside on storage servers that are the most economical to operate, but offer the least amount of accessibility, durability, and/or reliability. Thus, in this example, as a particular piece of data become less mission critical and more historical, the particular piece of data may be incrementally relocated from data stores of the "first tier", to the data stores of the "second tier", and then finally to the data stores of the "third tier".

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure is directed, in part, to the movement of data objects between tiered data stores of a data storage system without the use of a central consistent location service. The data storage system may be a tiered data storage system that includes data stores that resides in different tiers, in which each tier of data stores provide different access speed, durability, reliability, and/or operational cost capabilities. Accordingly, data objects may be moved between the data stores of the tiered data storage system as the access criteria, frequency of use, value, security needs, and/or other factors of each data object changes over time. The movement of the data objects between different data stores may be accomplished through a series of replication steps that moves each data object from a source data store to a destination data store. Moreover, the movement of the data objects through these replication steps may be protected by optimistic locking to prevent transaction conflicts, as well as mechanisms that provide error recovery and retry in the event of failure in the replication steps. Accordingly, the data relocation logics and mechanisms described herein may enable the efficient movement of data objects between different data stores without the use of a central consistent location service. In this way, the additional computing and technical support resources associated with maintaining the central consistent location service may be reduced or avoided. In various instances, the data storage system may be a database system that is based on the relational database management system (RDBMS) model, or a binary large object (blob) distributed storage system. As such, the data storage system may have guaranteed read-write consistency and optimistic locking capabilities.

In some embodiments, a data object may be moved from a source data store to a destination data store via replication. The replication is initiated when an original data object in a source data store that is capable of being both read from and being written to is read. Following the read, the original data object is then duplicated to a destination data store. The duplicate data object is provided with a state that indicates the duplicate object is duplicated from the source data store and can be read but cannot accept a data write. Subsequently, the state of the original data object is changed to can be read but cannot be written to using optimistic locking. Further, the state of the duplicate data object is also modified to being capable of both read from and written to with the use of optimistic locking. The replication is completed with the deletion of the original data object from the source data store.

Illustrative System Architecture

Figure 1:
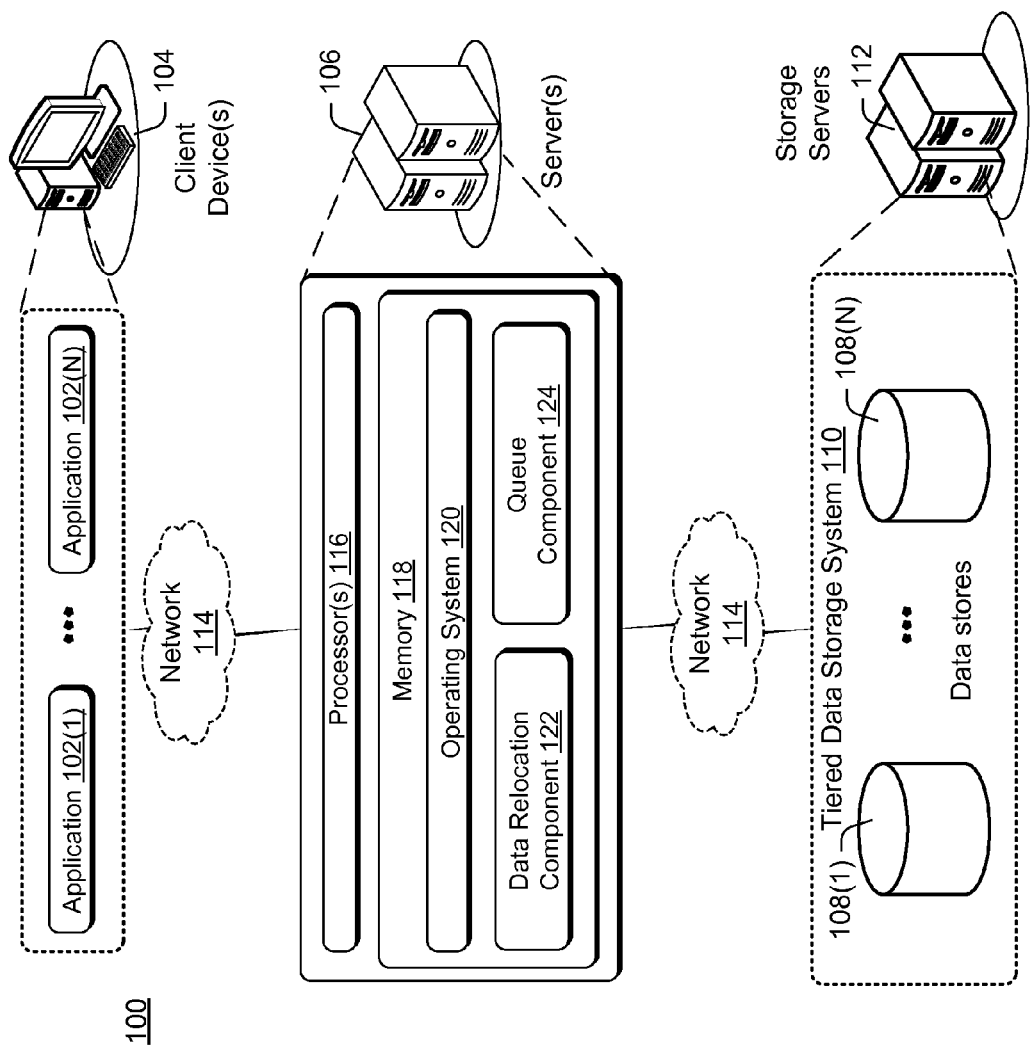
FIG. 1 shows an illustrative computing environment for moving data between data stores of a tiered data storage system without the use of a consistent location service.

FIG. 1 shows an illustrative computing environment 100 for moving data between data stores of a tiered data storage system without the use of a consistent location service. The environment 100 may include applications 102(1)-102(N) that may reside on one or more client devices 104, one or more servers 106 that include logics for moving data between tiered data stores, and a plurality of tiered data stores 108(1)-108(N) of a tiered data storage system 110 that resides on one or more storage servers 112.

Each of the client devices 104 may be electronic device that is capable of receiving, processing and transmitting data to another device. In various embodiments, each of the client devices 104 may be a laptop computer, a desktop computer, a server, or another electronic device that is equipped with network communication components, data processing components, and at least one electronic display for displaying data. The application 102(1)-102(N) may include any application that uses a distributed data storage system. For example, the applications 102(1)-102(N) may include a web transaction application that receives online purchase requests from users, an online banking application that provide users with web access to financial information, an corporate inventory application that keep real time track of inventory, and/or the like. In some embodiments, at least one of the applications 102(1)-102(N) may also be implemented on the servers 106, rather than on the one or more client devices 104.

The storage servers 112 that implement the data stores 108 may be located in a single data center, or across multiple data centers. Moreover, the data centers may be located at a single geographical location, or across multiple geographical locations around the globe. In various embodiments, the data stores 108(1)-108(N) may be traditional data store, such as a relational database management system (RDBMS) data store, or blob data stores. Additionally, the data stores 108(1)-108(N) may be tiered data stores that have different characteristics. For example, the data store 108(1) may be a first tier data store that has the highest accessibility, durability and/or reliability. On the other hand, the data store 108(N) may be second tier data store that is less robust and reliable than the data store 108(1). As part of a tiered data storage system 110, the data stores 108(1)-108(N) have guaranteed read-write consistency and optimistic locking capabilities. In alternative embodiments, the logics for moving data between the tiered data stores 108(1)-108(N) may be provided in one or more of the storage servers 112 rather than on the servers 106.

The client devices 104, the server 106, and the storage servers 112 may be communicatively connected by a network 114. The network 114 may be a local area network ("LAN"), a larger network such as a wide area network ("WAN"), or a collection of networks, such as the Internet. Protocols for network communication, such as TCP/IP, may be used to implement the network 114. Although embodiments are described herein as using a network such as the Internet, other distribution techniques may be implemented. In various embodiments, the applications 102(1)-102(N) may communicate with the data stores 108(1)-108(N) of the tiered data storage system 110 through the network 114 via a middleware interface layer, such as a database abstraction layer. The middleware interface layer may reside on at least one of the storage servers 112 or the server 106 to enable the applications 102(1)-102(N) to store, modify, delete, and retrieve data from the tiered data stores 108(1)-108(N).

The server 106 may include one or more processors 116, a memory 118, and user controls that enable a user to interact with the server 106. User controls may include, but are not limited to, combinations of one or more of keypads, keyboards, mouse devices, touch screens, microphones, speech recognition packages, and any other suitable devices or other electronic/software selection methods. The memory 118 may include volatile and/or nonvolatile memory, removable and/or non-removable media implemented in any method or technology for storage of information, such as computer-readable instructions, data structures, program modules or other data. Such memory may include, but is not limited to, random access memory (RAM), read-only memory (ROM), electrically erasable programmable read-only memory (EEPROM), flash memory or other memory technology; CD-ROM, digital versatile disks (DVD) or other optical storage; magnetic cassettes, magnetic tape, magnetic disk storage or other magnetic storage devices; and RAID storage systems, or any other medium which can be used to store the desired information and is accessible by a computer system.

The operating system 120 may be stored in memory 118. The operating system 120 may include components that enable the server 106 to receive data via various inputs (e.g., user controls, network interfaces, and/or memory devices), and process the data using the one or more processors 116 to generate output. The operating system 120 may include one or more components that present the output (e.g., display an image on an electronic display, store data in memory, transmit data to another electronic device, etc.). Additionally, the operating system 120 may include other components that perform various other functions generally associated with an operating system.

In addition to the operating system 120, the memory 118 may further store other components, which may include routines, programs instructions, objects, and/or data structures that perform particular tasks or implement particular abstract data types. The movement of data objects between different data stores of the data stores 108(1)-108(N) may be facilitated by a data relocation component 122 that is stored in the memory 118. In alternative embodiments, rather than being stored in the memory 118, the data relocation component 122 may reside in a similar memory that is in one of the storage servers 112. A queue component 124 may also be stored in the memory 118. In various embodiments, the queue component 124 may store data object relocation requests from the applications 102(1)-102(N) so that such requests may be fulfilled by the data relocation component 122. In some embodiments, the data relocation component 122 and the queue component 122 may be a part of the middleware interface layer. The data replication steps performed by the data relocation component 122 are further illustrated in FIGS. 2-8.

Figure 2:
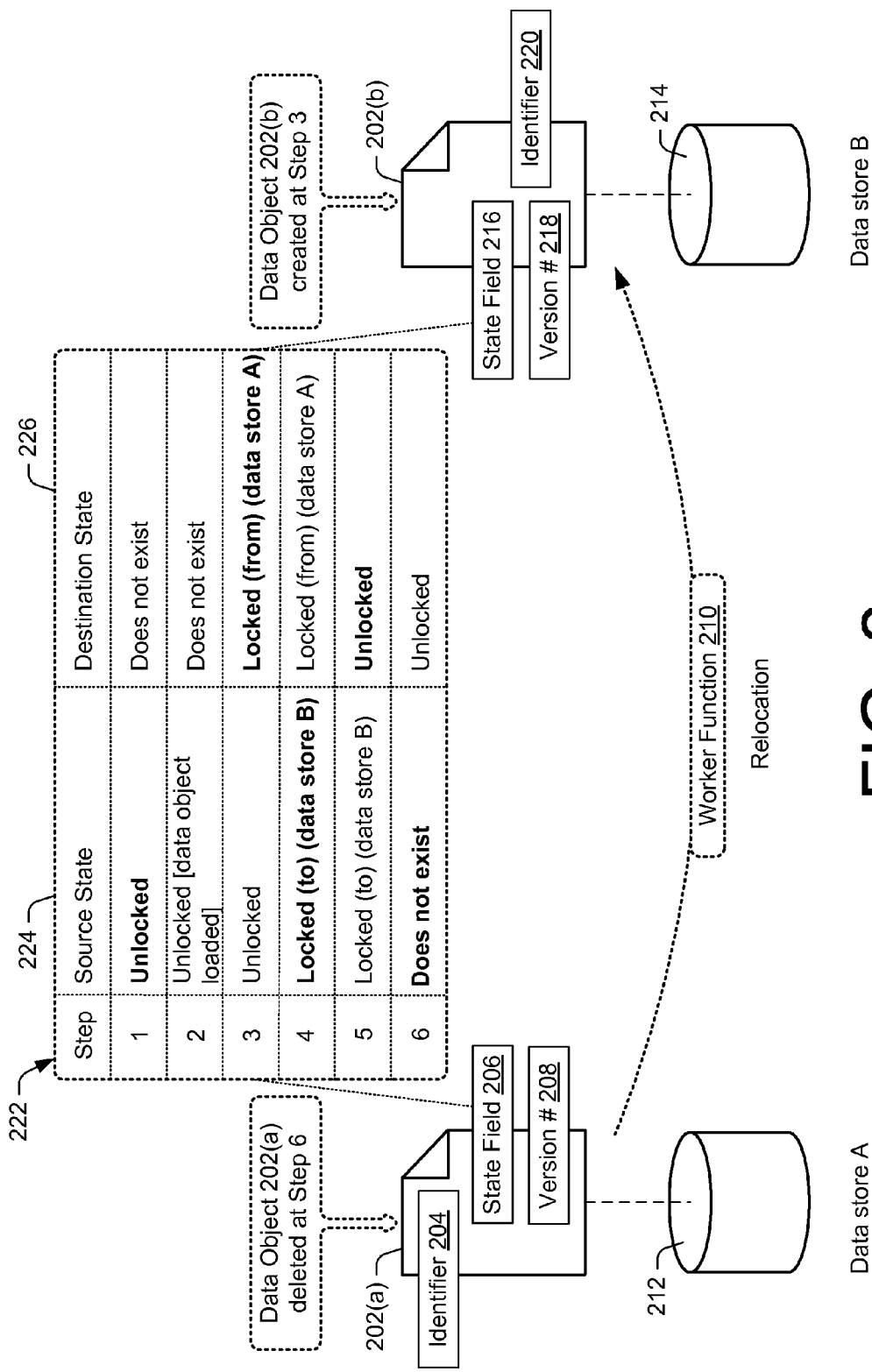
FIG. 2 shows an illustrative block diagram of the replication steps for moving a data object between tiered data stores of a tiered data storage system without the use of a consistent location service.

FIG. 2 shows an illustrative block diagram of the initial steps for moving a data object between tiered data stores of a tiered data storage system 110 without the use of a consistent location service. As shown, a data object that is to be moved by the data relocation component 122, such as the data object 202(*a*), may include an identifier 204 and a state field 206. The data object 202(*a*) may be any piece of data within some type of data container. The state field 206 may be a piece of metadata that is associated with the data object 202(a) and stored with the data object 202(a). In embodiments in which the tiered data storage system 110 is a RDBMS, state field 206 may be stored in a data column (e.g., a SITE column) of a database table that also stores the data object 202(a). In other embodiments in which the tiered data storage system 110 is a blob storage system, the state field 206 may be prefix or suffix metadata that is appended to the data object 202(a) (e.g., a first byte of data or a last byte of data in the data object 202(a)). In such embodiments, the data object 202(a) may include special indicators that indicate the respective locations of the state field 206 and the substantive data in the data object 202(a), so that the data relocation component 122 may access the two types of data via a sparse read and/or update. Accordingly, because the state field 206 may be either stored within the same table as the data object 202(a), or actually stored within the data object 202(a), the state field 206 may be protected by the same optimistic locking that protects the data object 202(a).

In various embodiments, the state field 206 of the data object 202(a) may hold up to three pieces of the information regarding the data object 202(a): (1) a locking state; (2) a pointer to a data store; and (3) whether the data object 202(a) has a state of "to" or "from" with respect to the data store, as embodied by one of a "to" indicator or a "from" indicator.

The locking state may be either "locked" or "unlocked", as indicated by a corresponding indicator. Accordingly, the tiered data storage system 110 may be configured to selectively permit or refuse an application, such as the application 102(1), write access to the data object 202(a). Specifically, a state of "locked" is a restricted state that may indicate to the tiered data storage system 110 to permit an application to read the data in the data object 202(a), but not to write to the data object 202(a). In contrast, a state of "unlocked" is an unrestricted state that may indicate to the tiered data storage system 110 that an application is to be permitted both read and write access to the data object 202(a).

The pointer in the state field 206 may point, depending on the circumstance, to a location of a source data store that the data object 202(a) is originally duplicated from, or to a destination data store to which a copy of data object 202(a) is created. For example, when the data object 202(a) currently resides on a data store "A", the state field 206 of the data object 202(a) may include a pointer that points to a data store "B". Likewise, when the data object 202(a) currently resides on a data store "B", the state field 206 may include a pointer that points to data store "A".

The state field 206 may include one of a "to" indicator (destination indicator) or a "from" indicator (source indicator) that is related to the pointer in the state field 206. Each of the "to" indicator and the "from" indicator may be a duplication indicator that indicate a direction of duplication. The "from" indicator may be present in the state field 206 when the data object 202(a) is duplicated from another data object that is stored in source data store. In contrast, the "to" indicator may be present in the state field 206 when the data object 202(a) is a duplicate data object that has been duplicated to a destination data store. In various embodiments, the three types of information described above may be stored in the state field 206 as a single data string, such as comma separate values (CSV). For example, the state field 206 may contain the information: "locked, to, database B".

The data object 202(a) may further include a version number 208 that is changed by the tiered data storage system 110 each time the data in the data object 202(a) is modified. For example, in an instance in which the data object 202(a) is a text document, the version number 208 may be changed when the content of the text document is modified. Moreover, since the state field 206 of the data object 202(a) is provided with the same optimistic locking protection, the version number 208 may also change when the information in the state field 206 is modified in any way for any reason. In various embodiments, the version number may be an incrementally updated value, a globally unique identifier (GUID), a current time, or a Lamport time. As further described below, with the use of the state field 206 and the version number 208, the data relocation component 122 may move the data object 202(a) from a source data store to a destination data store in an optimistically consistent manner.

As further shown in FIG. 2, the data relocation component 122 may instantiate a worker function 210 to "move" the data object 202(a) from a source data store "A" 212 to a destination data store "B" 214 via a series replication steps. The data relocation component 122 may instantiate the worker function 210 upon a request from an application, such as the application 102(1). In various embodiments, the data store "A" 210 and the data store "B" 212 may belong to the same tier of the tiered data storage system 110, or belong to different tiers of the tiered data storage system 110. As further described below, the "move" actually involves the creation of a duplicate data object 202(b) in the data store "B" 214 that contains the substantive data of the data object 202(a), and the deletion of the data object 202(a) from the data store "A" 212. Once created, the duplicate data object 202(b) may include its own state field 216, a version number 218, and an identifier 220 that is identical to the identifier 204.

The information in the state field 206 of the data object 202(a) and information in the state field 206 of the data object 202(b) during the replication steps may be illustrated in FIG. 2 by a table 222. Specifically, column 224 of the table 222 may show information in the state field 206 of the data object 202(a). Likewise, column 226 of the table 222 may show information in the state field 216 of the data object 202(b). The data relocation component 122 may use the information in the state field 206 of the data object 202(a) and the state field 216 of the data object 202(b) to ensure optimistic consistency during the replication steps.

As shown in table 222, at step "1" of the replication, the worker function 210 may verify that the original data object 202(a) in the data store "A" 212 has a state of "unlocked", as indicated by the state field 206. The "unlocked" state means that the data object 202(a) may be both read and modified by an application. No other information is otherwise contained in the state field 206. At this point, as shown in the column 226, no corresponding state exists as the data object 202(b) and its corresponding state field 216 do not yet exist.

At step "2" of the replication, the worker function 210 may read the data that is in the data object 202(a), as well as the version number 208 of the data object 202(a). As shown in column 224, the state of the data object 202(a) remains "unlocked" at this step.

At step "3" of the replication, the worker function 210 may create a duplicate of the original data object 202(a), which is the data object 202(b), in the data store "B" 214. As described above, the duplicate data object 202(b) may be created with its own identifier 220 that is identical to the identifier 204, as well as its own state field 216. At this point, the state field 216 may hold the information "locked (from) (data store A)", which indicates that the data object 202(b) is locked from write attempts by an application, and that the data object 202(b) is duplicated from the data store "A" 212.

The creation of the data object 202(b) on the data store "B" 214 may be protected by redundant duplication prevention. In other words, prior to creating the data object 202(b), the worker function 210 may verify that a data object with an identifier that is identical to the identifier 204 does not already exist on the data store "B" 214. Thus, the worker function 210 may only create the data object 202(b) if no such data object preexists. Conversely, the worker function 210 may abort the creation of the data object 202(b) and reattempt the replication if the worker function 210 determines that a data object with the identifier 204 already exists on the data store "B" 214.

At step "4" of the replication, the worker function 210 may change the information in state field 206 of the data object 202(a) to "locked (to) (data store B)", as shown in the column 224. The changed information in the state field 206 may indicate that the data object 202(a) is locked from any write attempts by an application, and that the data object 202(a) is duplicated to the data store "B" 214. On the other hand, as shown in column 226, the information in the state field 216 of the data object 202(b) may remain as "locked (from) (data store A)" at step "4".

The change of the state field 206 of the data object 202(a) at step "4" may be protected by optimistic locking. Recall that the version number 208 of the data object 202(a) was read by the worker function 210 at step "2" of the replication. Moreover, the version number 208 of the data object 202(a) may be changed if any data in the data object 202(a), including the state field 206, is modified by another worker function. Thus, the worker function 210 may pass the version number 208, as read at step "2", to the optimistic concurrency logics of the tiered data storage system 110. In turn, the tiered data storage system 110 may read the version number 208 for a second time prior to saving the change to the information in the state field 206. The tiered data storage system 110 may only save the change to the information in the state field 206 when the version number 208 that it received from the worker function 210 matches the current version number 208 that the tiered data storage system 110 read for itself. As a result, if the version number 208 had already been changed prior to step "4" due to some data modification by another worker function, the tiered data storage system 110 may reject the change to the information in the state field 206 of the data object 202(a). In turn, the worker function 210 may abort the change and delete the data object 202(b) from the data store "B" 214. However, in some embodiments, the worker function 210 may abort the change without deleting the data object 202(b) from the data store "B" 214. Instead, as further described below, the data object 202(b) in the data store "B" may simply be overwritten during a retry attempt of the move of the data object 202(a) to the data store "B" 214.

On the other hand, if the two readings of the version number 208 match, the optimistic concurrency logic of the tiered data storage system 110 may permit the changes made by the worker function 210 to the state field 206 to be saved. Moreover, because the worker function 210 changed the state field 206, the optimistic concurrency logics of the tiered data storage system 110 may subsequently change the version number 208 of the data object 202(a).

Next, as further shown in column 226, the worker function 210 may change the information in the state field 216 so that the state of the data object 202(b) is "unlocked" at step "5" of the replication. In this way, the state field 216 may no longer indicate that the data object 202(b) was duplicated from data store "A" 212. Further, the "unlocked" state means that the data object 202(b) may be both read and modified at this point. On the other hand, as shown in the column 224, the information in the state field 216 of the data object 202(a) may remain as "locked (to) (data store B)" at step "5".

The change of the information in the state field 216 of the data object 202(b) at step "5" may also be protected by optimistic locking. Thus, the worker function 210 may pass the version number 218, which the worker function 210 obtained during the creation of the data object 202(b), to the optimistic concurrency logics of the tiered data storage system 110. In turn, the tiered data storage system 110 may read the version number 218 for a second time prior to saving the change to the information in the state field 216. Thus, the tiered data storage system 110 may only save the change to the information in the state field 216 when the version number 218 that it received from the worker function 210 matches the version number 218 that the tiered data storage system 110 read for itself. As a result, if the version number 218 had already been changed prior to step "5" due to some data modification by another worker function, the tiered data storage system 110 may reject the change to the information in the state field 216 of the data object 202(b). In turn, the worker function 210 may abort the change.

On the other hand, if the two readings of the version number 218 match, the optimistic concurrency logic of the tiered data storage system 110 may permit the changes made by the worker function 210 to the state field 216 to be saved. Moreover, because the worker function 210 changed the state field 216, the optimistic concurrency logics of the tiered data storage system 110 may subsequently change the version number 218 of the data object 202(b).

At step "6" of the replication, the worker function 210 may delete the data object 202(a) (along with the state field 206 and version number 208) from the data store "A" 212 to complete the "move" of the data object 202(a) to the data store "B" 214. Thus, as shown in the column 224, the state field 206 no longer exists due to the deletion of the data object 202(b). The worker function 210 may inform the data relocation component 122 of the completion once it finishes the replication.

In various embodiments, the data relocation component 122 may make use of guaranteed retries throughout the replication described above. Accordingly, in cases of replication failures or aborts, a worker function, such as the worker function 210, may infer the step in the replication where the failure occurred, and resume the replication from the next appropriate step in a retry attempt. This inference is possible because the combination of state fields at each replication step is unique. For example, assuming that data in the data object 202(a) was found to have been previously modified when the worker function 210 reached step "4", and optimistic locking resulted in the abort of replication by the worker function 210. Subsequently, at the retry attempt, the worker function 210 may be reinitiated by the data relocation component 122 to resume at step "2", that is, once again read the data in the data object 202(a), as well as the version number 208 of the data object 202(a), and create the data object 202(b) on the data store "B" 214. In some instances, this creation of the data object 202(b) during retry may overwrite any existing data object 202(b) that is left on the data store "B" 214 from the previously aborted replication. Thus, assuming that the version number 208 remains the same in this retry through step "4", the worker function 210 may complete the replication during this second retry attempt.

In some embodiments, the data relocation component 122 may be configured to repeat the performance of retry attempts until a successful completion of the replication is reached. In such embodiments, the data relocation component 122 may employ an exponential back off algorithm to time such retry attempts. For example, the exponential back off may decrease the rate at which repeated retries are attempted so that the possibility of conflicting with data modifications by other worker functions is gradually reduced, and the chance of a successful replication completion is gradually increased.

The role of optimistic locking in protecting each replication that "moves" a data object from a first data store to a second data store, as well as the utility of inferring a step where a failure occurred and retrying a replication from the next appropriate step, may be apparent in a scenario in which multiple worker function are concurrently attempting the sane data object move. In an example scenario, when two worker functions are concurrently moving the data object 202(a) from the data store "A" 212 to the data store "B" 214, a first worker function may complete the creation of the data object 202(b) on the data store "B" 214 by performing the replication through step "3" before experiencing a delay. However, a second worker function that is initiated shortly after the first worker function may be stopped by redundant duplication prevention from creating the same data object 202(b) on the data store "B" 214. At which point the second worker function will attempt a retry.

During the retry attempt, the data relocation component 122 may determine that first worker function has already completed the replication through step "3". As a result, the data relocation component 122 may cause the second worker function to proceed with step "4" of the replication. If the first worker thread is still experiencing the delay, the second worker function may successfully change the information in the state field 206 to "locked (to) (data store B)". This successful information change to state field 206 also means that the version number 208 of the data object 202(a) may be changed by the optimistic concurrency logics of the tiered data storage system 110. At this point in the example scenario, the second worker function may experience a delay.

Subsequently, the first worker function may emerge from its delay and attempt to perform step "4". However, since the version number 208 of the data object 202(a) had already changed because step "4" has been completed by the second worker function, optimistic locking may cause the first worker function to fail and retry. Upon the retry attempt, the data relocation component 122 may determine that the first worker function has already completed the replication through step "4". As a result, data relocation component 122 may cause the first worker function to proceed with step "5" and successfully change the state in the state field 216 of the data object 202(b) to "unlocked". This successful state change to state field 216 also means that the version number 208 of the data object 202(a) may be changed by optimistic concurrency logics of the tiered data storage system 110. Thus, if the second worker function emerges from its delay and attempts to also perform step "5" (i.e., change the state in the state field 216 to "unlocked"), optimistic locking may cause the second worker function to fail and retry.

Upon retry, the data relocation component 122 may determine that the first worker function has completed the replication through step "5". Thus, the data relocation component 122 may cause the second worker function to perform step "6" to complete the "move" of the data object 202(a) to the data store "B" 214 by deleting the data object 202(a) from the data store "A" 212. At this point, when the first worker function attempts to perform step "6", it may determine that the "move" of the data object 202(a) is already completed as the data object 202(a) no longer exists on the data store "A" 212 and the state of the data object 202(b) is unlocked. Having made such a determination, the data relocation component 122 may permanently terminate the first worker function.

As can be ascertained from the above description, in a scenario in which two worker functions are concurrently moving the same data object from a source data store to a destination data store, one worker function is likely to succeed at each step while the other worker function is likely to encounter an optimistic lock error and retry. In this way, replication progress may be made via the combination of the two worker functions "leapfrogging" over each other until the replication is completed.

In some instances, a worker function initiated by the data relocation component 122 to move a data object for a first time or retry the move of a data object from a source data store to a destination data store may encounter a data object in the source data store that does not have an "unlocked" state. In such instances, the data relocation component 122 may cause the worker function to perform differently based on (1) information in the state field of the data object; (2) the presence or absence of a corresponding duplicate data object in the destination data store; and/or (3) if applicable, the information in the state field of the duplicate data object in the destination data store. Such different behaviors by the worker function are illustrated below in FIGS. 3-8. It will be appreciated that in such figures, the reference to a specific numbered "step", e.g., step "4", refers to a step that is similar to its corresponding step described in FIG. 2. Furthermore, while the steps of each replication carried out by the data relocation component 122 is described as being implemented by a worker function, it will be appreciated that each "worker function", as used throughout, may refer to a collection of tasks performed by various logics of the data relocation component 122 to implement each replication.

Figure 3:
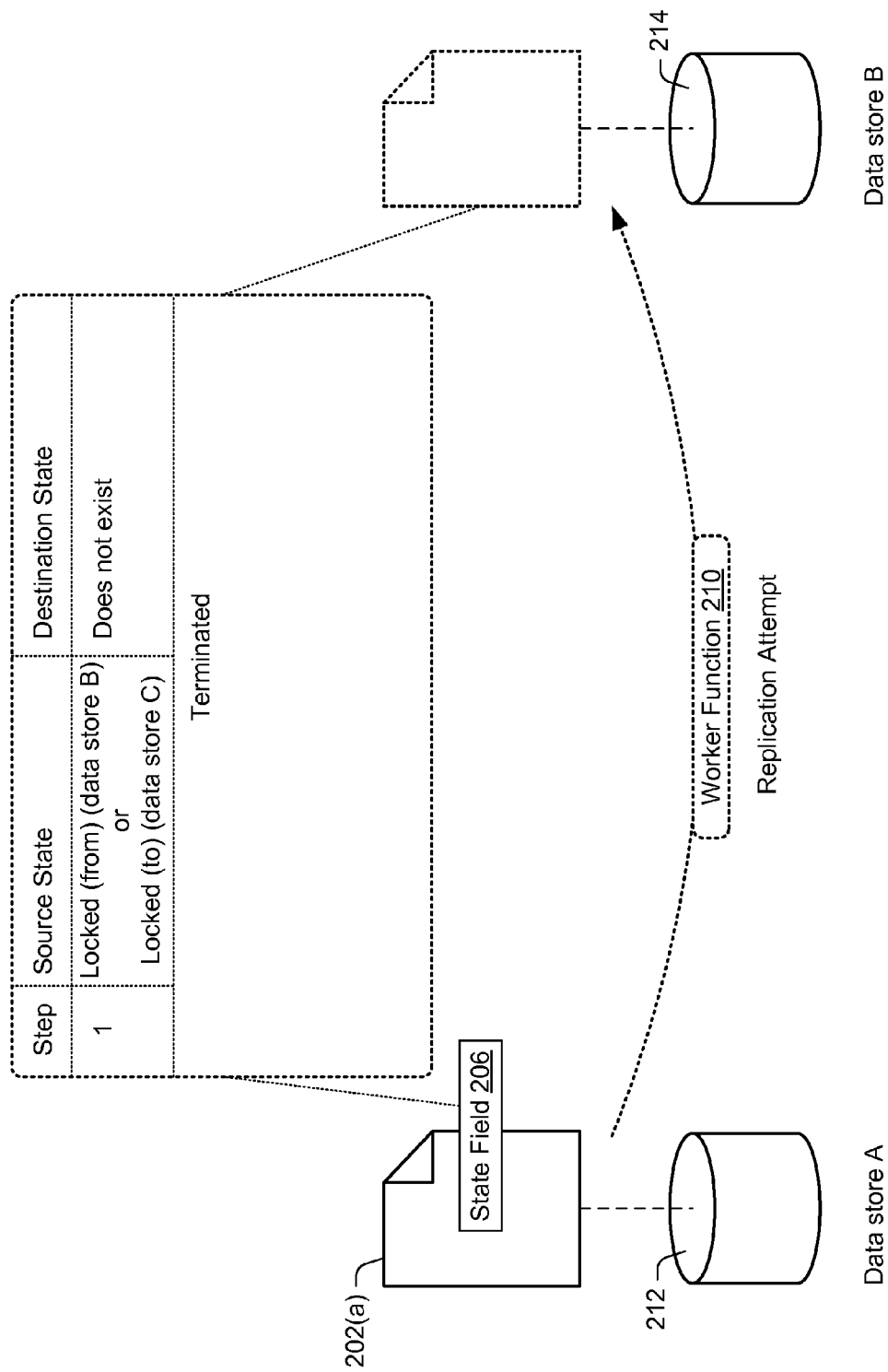
FIG. 3 shows an illustrative block diagram of a scenario in which a worker function is permanently terminated during replication by a data relocation component based on information in a state field of a data object in a source data store.

FIG. 3 shows an illustrative block diagram of a scenario in which a worker function is permanently terminated during replication by the data relocation component 122 based on information in a state field of a data object in a source data store. As shown in FIG. 3, a worker function 210 may be trying to move a data object 202(a) from the data store "A" 212 to the data store "B" 214 for a first time, as previously described in FIG. 2. However, while performing step "1" of the replication described in FIG. 2, the worker function 210 may determine that the state field 206 of the data object 202(a) holds the information "locked (from) (data store B)" or "locked (to) (data store C)". The "locked (from) (data store B)" may occur when another worker function is in the process of moving a duplicate of the data object 202(a) from the data store "B" 214 back to the data store "A" 212. The "locked (to) (data store C)" may occur when another worker function is in the process of moving the data object 202(a) from the data store "A" 212 to another data store that is not the data store "B" 214. Accordingly, once the worker function 210 determines that another move of the data object 202(a) by a different worker function to some data store other than the data store "B" 214 is already in progress, the data relocation component 122 may permanently terminate the worker function 210 to abort the attempt to move the data object 202(a) from the data store "A" 212 to the data store "B" 214.

Likewise, in additional embodiments, if the worker function 210 encounters the same information in the state field 206 of the data object 202(a) during a retry of the same move, the data relocation component 122 may also permanently terminate the worker function 210.

Figure 4:
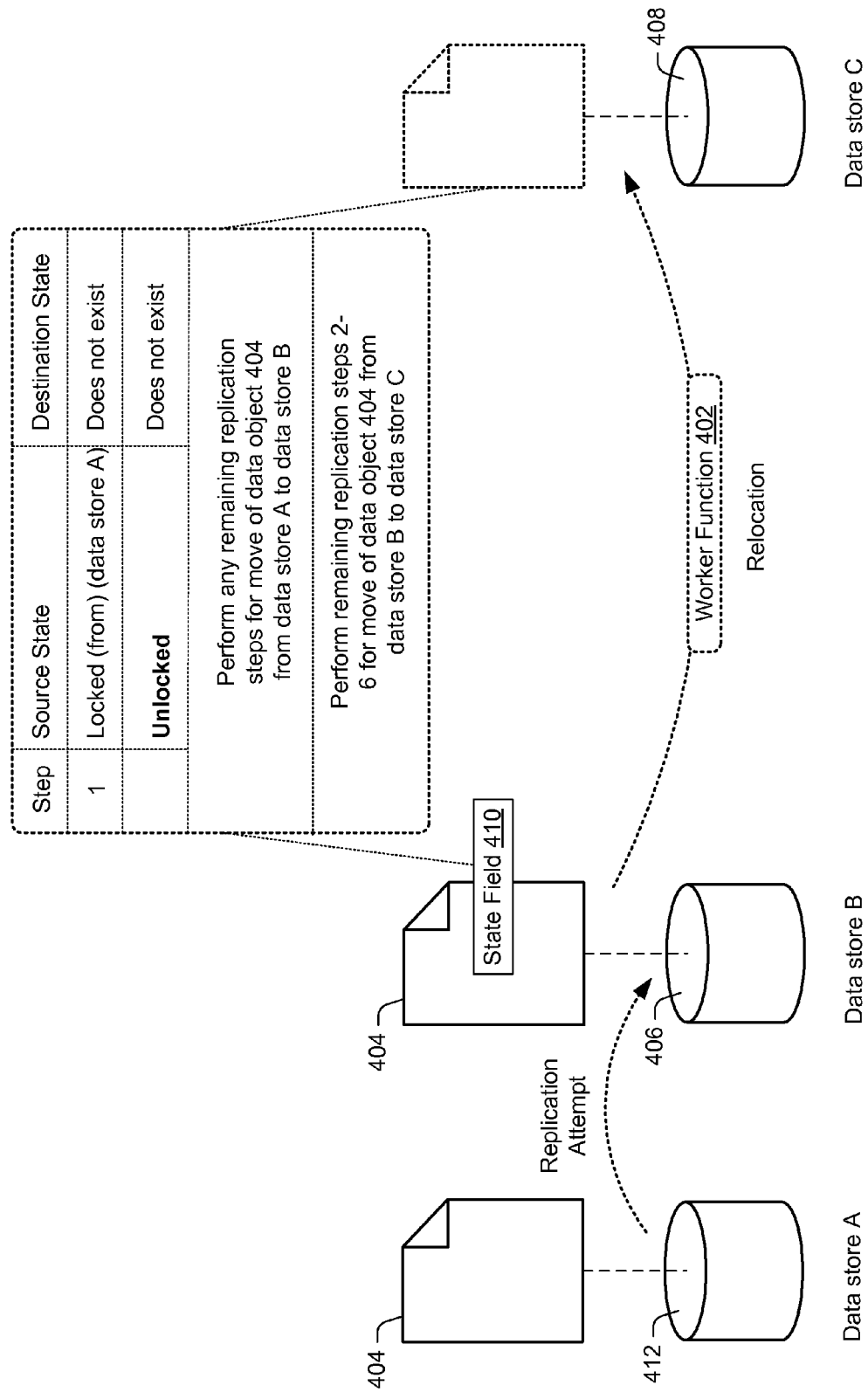
FIG. 4 shows an illustrative block diagram of a scenario in which a worker function may forcibly modify the information in a state field of a data object that is to be moved from a source data store to a destination data store.

FIG. 4 shows an illustrative block diagram of a scenario in which a worker function may forcibly modify the information in a state field of a data object that is to be moved from a source data store to a destination data store. As shown in FIG. 4, a worker function 402 may be trying to move a data object 404 from a data store "B" 406 to a data store "C" 408. However, while performing step "1" of the replication, the worker function 210 may determine that the state field 410 of the data object 404 holds the information "locked (from) (data store A)". In other words, it is likely that another worker function that is moving the data object 404 from the data store "A" 412 to the data store "B" 406 is either still in progress or has failed prematurely. In such a scenario, the data relocation component 122 may force the completion of the move of the data object 404 to the data store "B" by using the worker function 402 to take over and complete the move of the data object 404 from the data store "A" 412 to the data store "B" 406. In various scenarios, if the other worker function stopped at step "3", the worker function 402 may perform step "4" through step "6" to complete the move of the data object 404 from the data store "A" 412 to the data store "B" 406. However, if the other worker function stopped at step "4", the worker function may perform "step "5" and step "6" to complete the move of the data object 404 from the data store "A" 412 to the data store "B" 406. Thus, at the end of the move of the data object 404 to the data store "B" 406, the information in the state field 410 of the data object 404 is "unlocked". Subsequently, the worker function 402 may complete the move of the data object 404 to the data store "C" 408 using replication steps that are similar to the replication steps described in FIG. 2, i.e., step "2" through step "6".

In some embodiments, the data relocation component 122 may wait for a predetermined amount of time prior to forcibly change the information in the state field 410 of the data object 404 from "locked (from) (data store A)" to "unlocked". The predetermined amount of time may present the other worker function with an opportunity to complete its replication steps in order to finish the move of the data object 404 to data store "B" 406.

Figure 5:
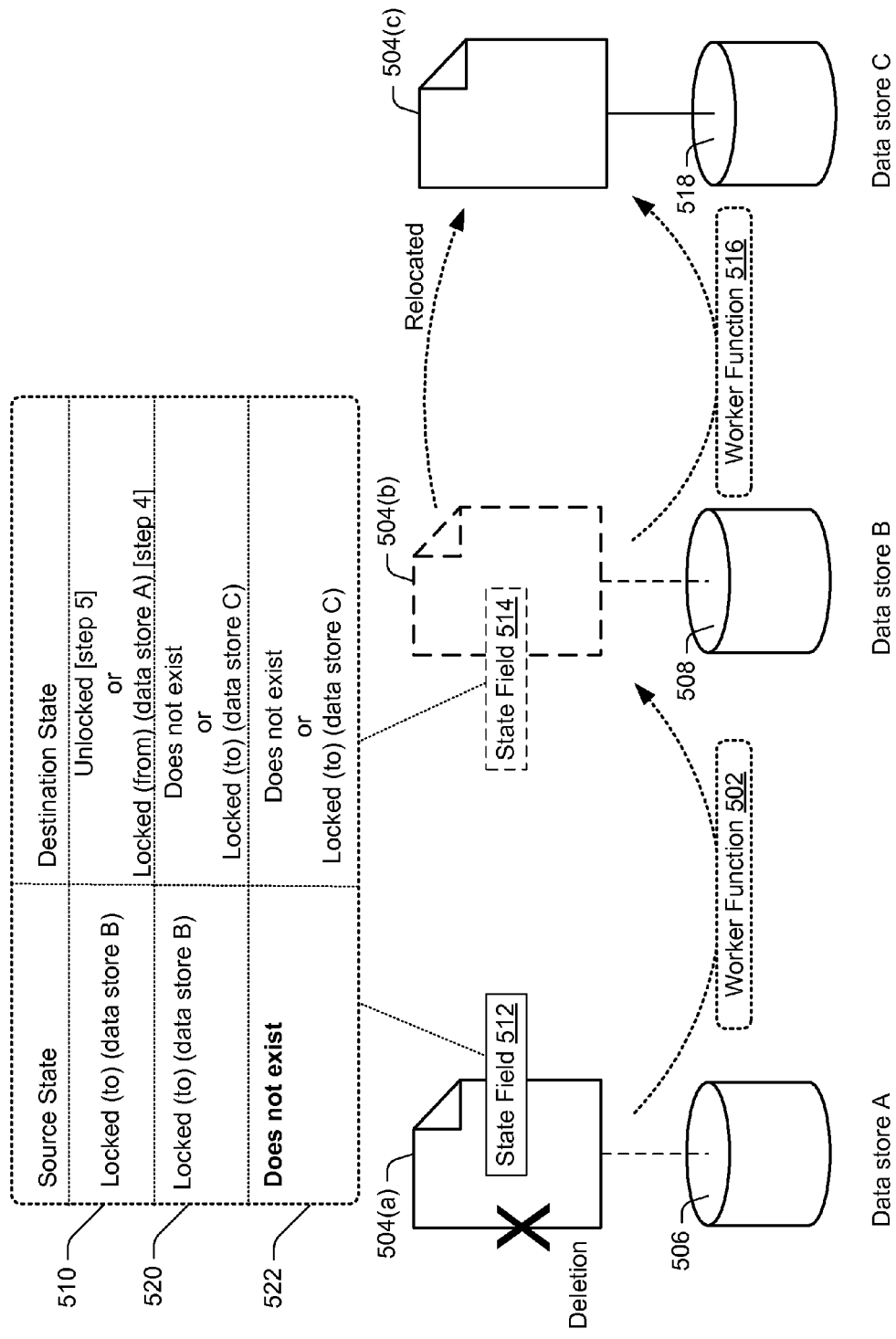
FIG. 5 shows an illustrative block diagram of recovery from a scenario in which replication by a worker function fails during concurrent moves of a data object between three tiered data stores.

FIG. 5 shows an illustrative block diagram of recovery from a scenario in which replication by a worker function fails during concurrent moves of a data object between three tiered data stores. As shown in FIG. 5, a worker function 502 may be moving a data object 504(a) from a data store "A" 506 to a data store "B" 508. However, the worker function 502 may prematurely fail near the completion of the replication (e.g. at step "4" or step "5"). As a result, as shown in row 510, the information in the state field 512 of the data object 504(a) may still be "locked (to) (data store B)". Moreover, a duplicate data object 504(b) may be present in the data store "B" 508. As further shown in row 510, the duplicate data object 504(b) may have a state field 514 that holds the information "unlocked" if the worker function 502 failed on step "5", and the information "locked (from) (data store A)" if the worker function 502 failed on step "4". As a result, the worker function 502 may be in the process of attempting a retry to complete the replication.

In the meantime, a second worker function 516 may be concurrently initiated by the data relocation component 122 to move the data object 504(b) to a data store "C" 518. The worker function 516 may have either successfully completed or substantially completed the move of the data object 504(b) to the data store "C" 518 before the attempted retry by the worker function 502. It will be appreciated if the worker function 502 had failed at step "4", that worker function 516 may have forced the data object 504(b) from the state of "locked (from) (data store A)" to a state of "unlocked", using the operations described in FIG. 4, prior to proceeding with its own move.

Thus, as shown in row 520, when the worker function 502 ascertains that state of the data object 504(a) as part of its retry attempt, the worker function 502 may discover that the state field 512 is either missing or holds the information "locked (to) (data store C)". For example, the state field 512 may be missing if the worker function 516 has completed its move. Alternatively, the state field 512 may be "locked (to) (data store C)" if the worker function 516 has completed the move through step "4" of the replication. Thus, since the worker function 502 is able to determine that the state field 512 is either missing or is not "locked (from) (data source A)", the worker function 502 at this point may determine that the data object 504(b) has already been located by another worker function (e.g., worker function 516). As a result, as shown in row 522, the data relocation component 122 may cause the worker function 502 to delete the data object 504(a) from the data store "A" 506 to complete its replication (i.e., state field 512 no longer exists).

Figure 6:
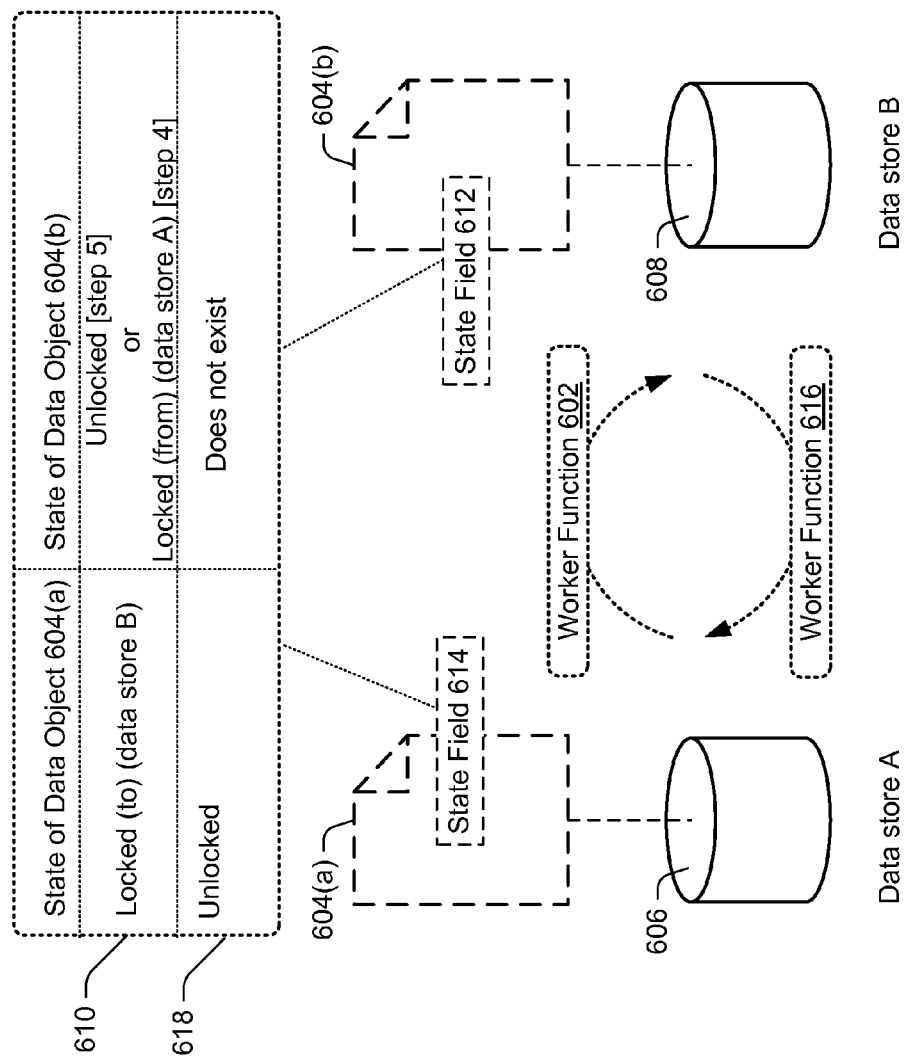
FIG. 6 shows an illustrative block diagram of recovery from a scenario in which replication by a worker function fails during concurrent moves of a data object mutually between two tiered data stores.

FIG. 6 shows an illustrative block diagram of recovery from a scenario in which replication by a worker function fails during concurrent moves of a data object mutually between two tiered data stores. As illustrated in FIG. 6, a worker function 602 may be in the process of moving a data object 604(a) from a data store "A" 606 to a data store "B" 608. However, the worker function 602 may fail partway through the replication (e.g., at step "4" or at step "5"). Thus, as shown in row 610, a duplicate data object 604(b) of the data object 604(a) may be present on the data store "B" 608. The data object 604(b) may include a state field 612 that holds a corresponding state of "unlocked" or "locked (from) (data store A)". Further, a state field 614 of the data object 604(a) may hold the information "locked (to) (data store B)".

In the meantime, a worker function 616 may have successfully performed a second "move" of the data object 604(b) back to the data store "A" 606. In the actual completion of such a move, the worker function 614 may have determined that the data object 604(a) already exists on data store "A" 606, so the worker function 616 may have completed its replication by skipping to and performing steps "4" through step "6". In other words, the worker function 616 may have first changed the state of the data object 604(b) to "locked (to) (data store A)", then changed the state of the data object 604(a) to unlocked, and finally deleted the data object 604(b).

Accordingly, a shown in row 618, the data object 604(b) may no longer exist on the data store "B" 608 when the worker function 602 now attempts the retry. Consequently, recognizing that while the state of the data object 604(a) had switched from a state of "locked (to) (data store B)" to a state of "unlocked" at this retry attempt, while data object 604(b) no longer exists on the data store "B" 608, the data relocation component 122 may cause the worker function 602 that is retrying the first move of the data object 604(a) to abort the replication attempt.

Figure 7:
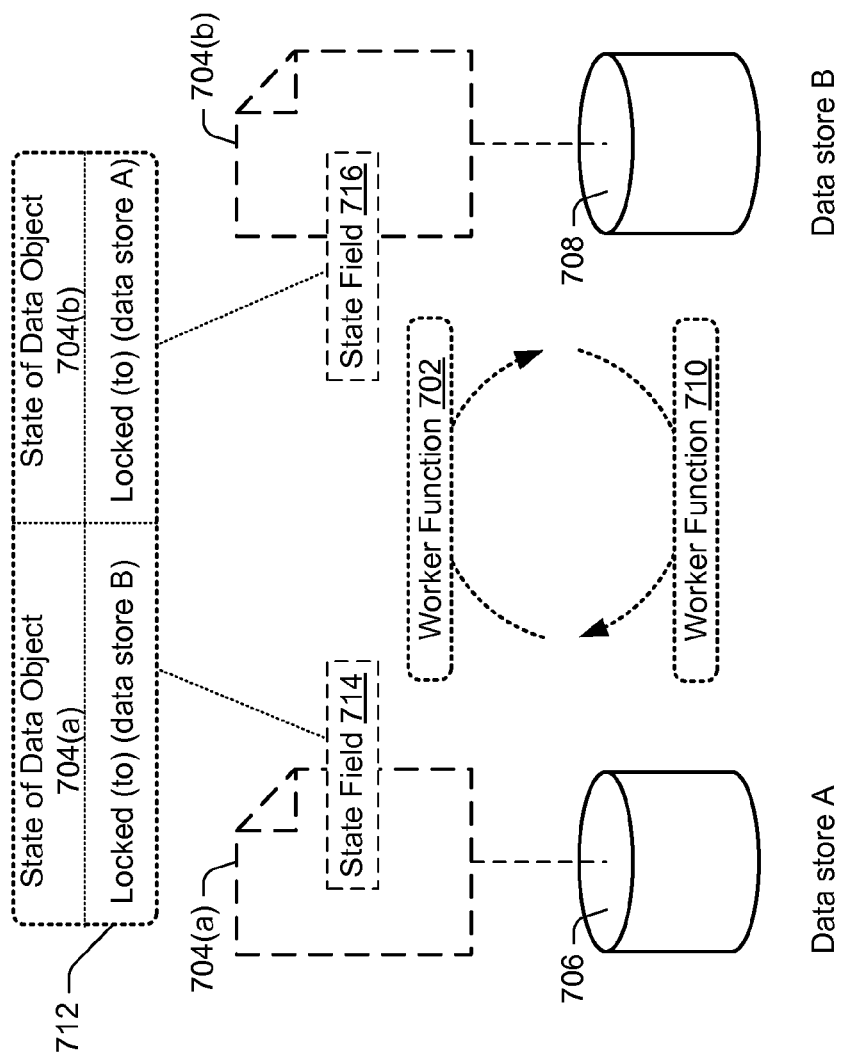
FIG. 7 shows an illustrative block diagram of recovery from a scenario in which replication by a worker function fails during concurrent moves of a data object mutually between two tiered data stores, in which duplicate data objects are locked to each other.

FIG. 7 shows an illustrative block diagram of recovery from a scenario in which replication by a worker function fails during concurrent moves of a data object mutually between two tiered data stores, in which duplicate data objects are locked to each other.

As illustrated in FIG. 7, a worker function 702 initiated by the data relocation component 122 may be in the process of moving a data object 704(a) from a data store "A" 706 to a data store "B" 708. However, the worker function 702 may fail partway through its replication (e.g., at step "4" or at step "5"). Thus, a duplicate data object 704(b) of the data object 704(a) may be present on the data store "B" 708. In the meantime, a worker function 710 that is also initiated by the data relocation component 122 may be in the process of moving the data object 704(b) from the data store "B" 708 back to the data store "A" 706. However, the worker function 710 may also fail partway through its replication after performing step "4". Thus, as shown in row 712, the state field 714 of the data object 704(a) may hold the information "locked (to) (data store B)", while the state field 716 of the data object 704(*b*) may hold the information "locked (to) (data store A)" in such a scenario.

At this point, each of the worker function 702 and worker function 710 may attempt to remedy such a mutual lock and reattempt its own replication. In various embodiments, having recognize the existence of such mutual "locked to" states, the worker function 702 may attempt to convert the state of the data object 704(*b*) from "locked (to) (data store A)" to "locked (from) (data store A)". Such a change to the information in the state field 716 of the data object 704(*b*) may enable the worker function 702 to complete its replication for data object 704(*a*). However, at the same time, worker function 710 may also recognize these mutual "locked to" states in the course of its retry attempt. Accordingly, the worker function 710 may attempt to convert the state of the data object 704(*a*) from "locked (to) (data store B)" to "locked (from) (data store B)", so that the worker function 710 may also complete its replication for the data object 704(*b*). Thus, as further describe in FIG. 8, the resolution of such conflicting retry attempts by the worker function 702 and the worker function 710 may be accomplished via the use exponential back off and optimistic locking.

Figure 8:
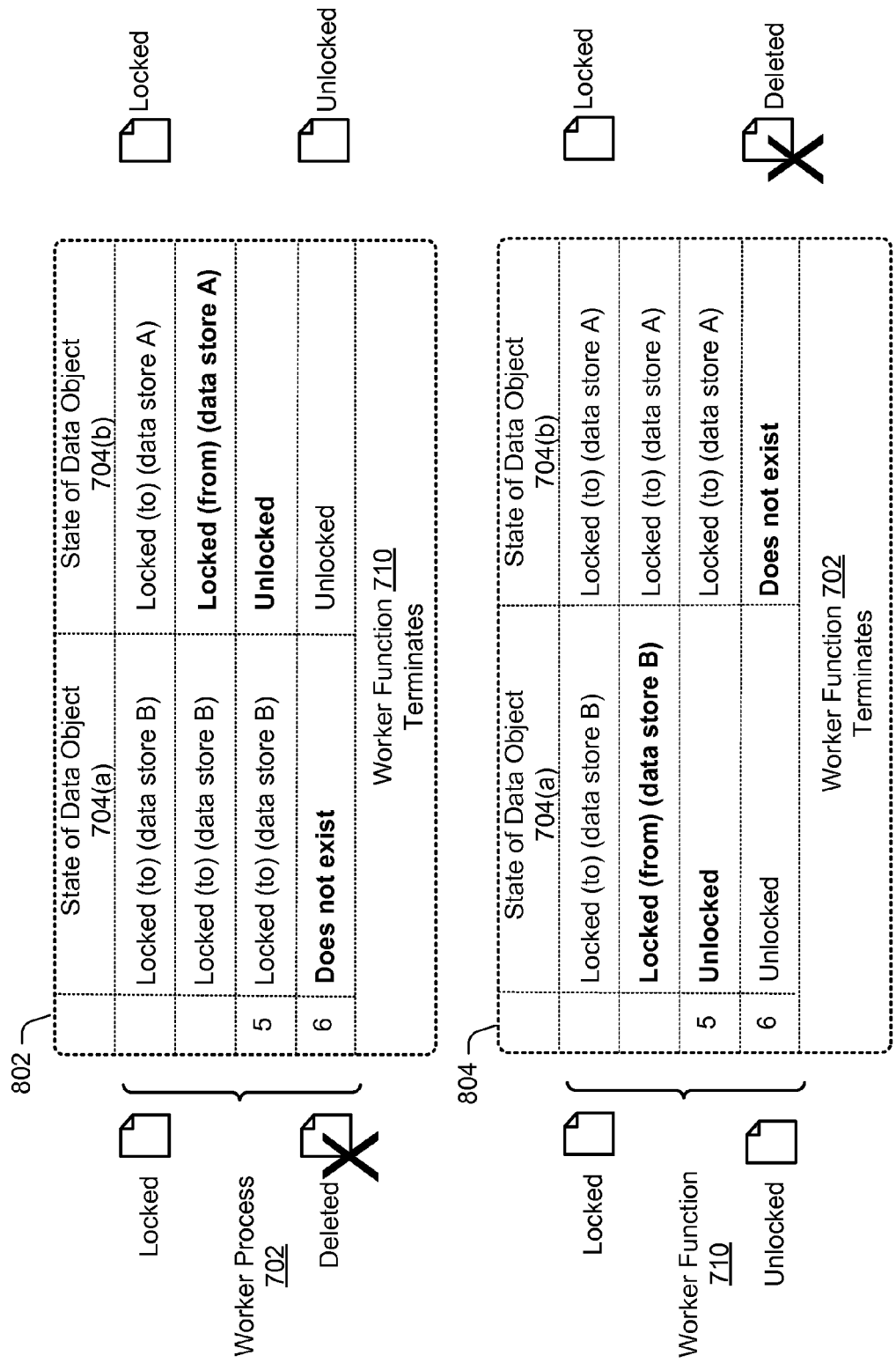
FIG. 8 shows illustrative block diagrams of the states of the duplicate data objects during different recoveries from a scenario in which replication by a worker function fails during concurrent moves of a data object mutually between two tiered data stores, in which duplicate data objects are locked to each other.

FIG. 8 shows illustrative block diagrams of the states of the duplicate data objects during different recoveries from the scenario described in FIG. 7, in which duplicate data objects are locked to each other. As shown in scenario 802, the state of the data object 704(*a*) may initially be "locked (to) (data store B)", and the state of data object 704(*b*) may initially be "locked (to) (data store A)". However, the worker function 702 is able to change the state of data object 704(*b*) to "locked (from) (data store A)" before the worker function 710 makes its own change attempt to the state of data object 704(*a*). In various embodiments, the precedence of the change by the worker function 702 may be due to the use of exponential back off. Moreover, once the worker function 702 has successfully changed the state of data object 704(*b*), optimistic locking may prevent an ensuing attempt by the worker function 710 to change the state of the data object 704(*a*). As a result, the worker function 702 may resume its performance of step "5" to change the state of the data object 704(*b*) on the data store "B" 708 to "unlocked", and complete its replication by deleting the data object 704(*a*) from the data store "A" 706 in step "6".

Subsequently, when the worker function 710 retries again, it may determine that while the state of the data object 704(*b*) is "unlocked", the data object 704(*a*) no longer exists on the data store "A" 706. Thus, the data relocation component 122 may conclude that the data object 704(*a*) had already been relocated, and therefore terminate any further retry attempts by the worker function 710.

Alternatively, as shown in scenario 804, the state of the data object 704(*a*) may initially be "locked (to) (data store B)", and the state of data object 704(*b*) may initially be "locked (to) (data store A)". However, the worker function 710 is able to change the state of data object 704(*a*) to "locked (from) (data store B)" before the worker function 702 makes its own change attempt to the state of data object 704(*b*). In various embodiments, the precedence of the change by the worker function 710 may be due to the use of exponential back off. Moreover, once the worker function 710 has successfully changed the state of the data object 704(*a*), optimistic locking may prevent an ensuing attempt by the worker function 702 to change the state of the data object 704(*b*). As a result, the worker function 710 may resume its performance of step "5" to change the state of the data object 704(*a*) on the data store "A" 706 to "unlocked", and complete its replication by deleting the data object 704(*b*) from the data store "B" 708 in step "6".

Subsequently, when the worker function 702 retries again, it may determine that while the state of the data object 704(*a*) is "unlocked", the data object 704(*b*) no longer exists on the data store "B" 708. Thus, the data relocation component 122 may conclude that the data object 704(*b*) had already been relocated, and therefore terminate any further retry attempts by the worker function 702.

Returning to FIG. 1, the data relocation component 122 may be configured to periodically check the data objects stored in the tiered data storage system 110 to determine whether a data object is to be moved from a first data store to a second data store based one or more relocation criteria. For example, the data relocation component 122 may be configured by a user to move data objects that are more than one year old from a "first tier" data store to a "second tier" data store for archival purposes. Accordingly, the data relocation component 122 may check on a periodic interval (e.g., once every hour, once a day, once a day) for any data objects that meets such relocation criteria, and automatically move data objects that fulfill such relocation criteria.

In other instances, an application, such as the application 102(1), may directly activate the data relocation component 122 to move data objects from a first data store to a second data store. For example, the application 102(1) may maintain an archive schedule for the data objects that it interacts with, and thus may activate the data relocation component 122 at its discretion to move data objects between the data stores of different tier levels. In some of such instances, the application 102(1) may determine that a data object is to be moved at a precise time. Thus, the application 102(1) may directly communicate the request to the data relocation component 122 for fulfillment.

However, in other of such instances in which the exact time of completion for a move request is not important, the application 102(1) may pass a move request to the queue component 124. In such instances, the data relocation component 122 may pull move requests from the queue component 124 to complete each move request at a time determined by the data relocation component 122.

In some embodiments, the queue component 124 may be a distributed queue messaging service that guarantees at-least-once delivery. Moreover, each move request may not be removed from the queue component 124 until the data relocation component 122 has completed the move request. Accordingly, a move request may remain in the queue component 124 until the data relocation component 122 explicitly informs the queue component 124 that the move of a data object is completed.

Illustrative Operations

Figure 9:
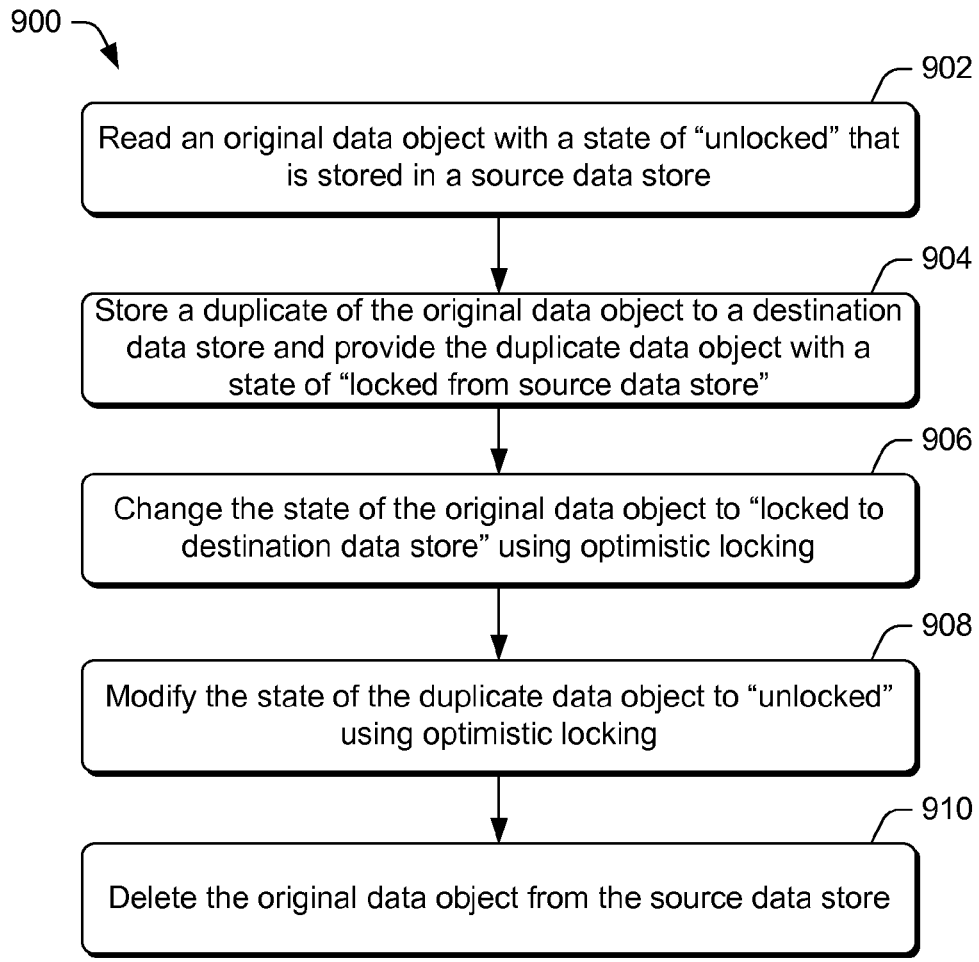
FIG. 9 is a flow diagram of an illustrative process for moving a data object between data stores of a data storage system via data object replication.
Figure 10:
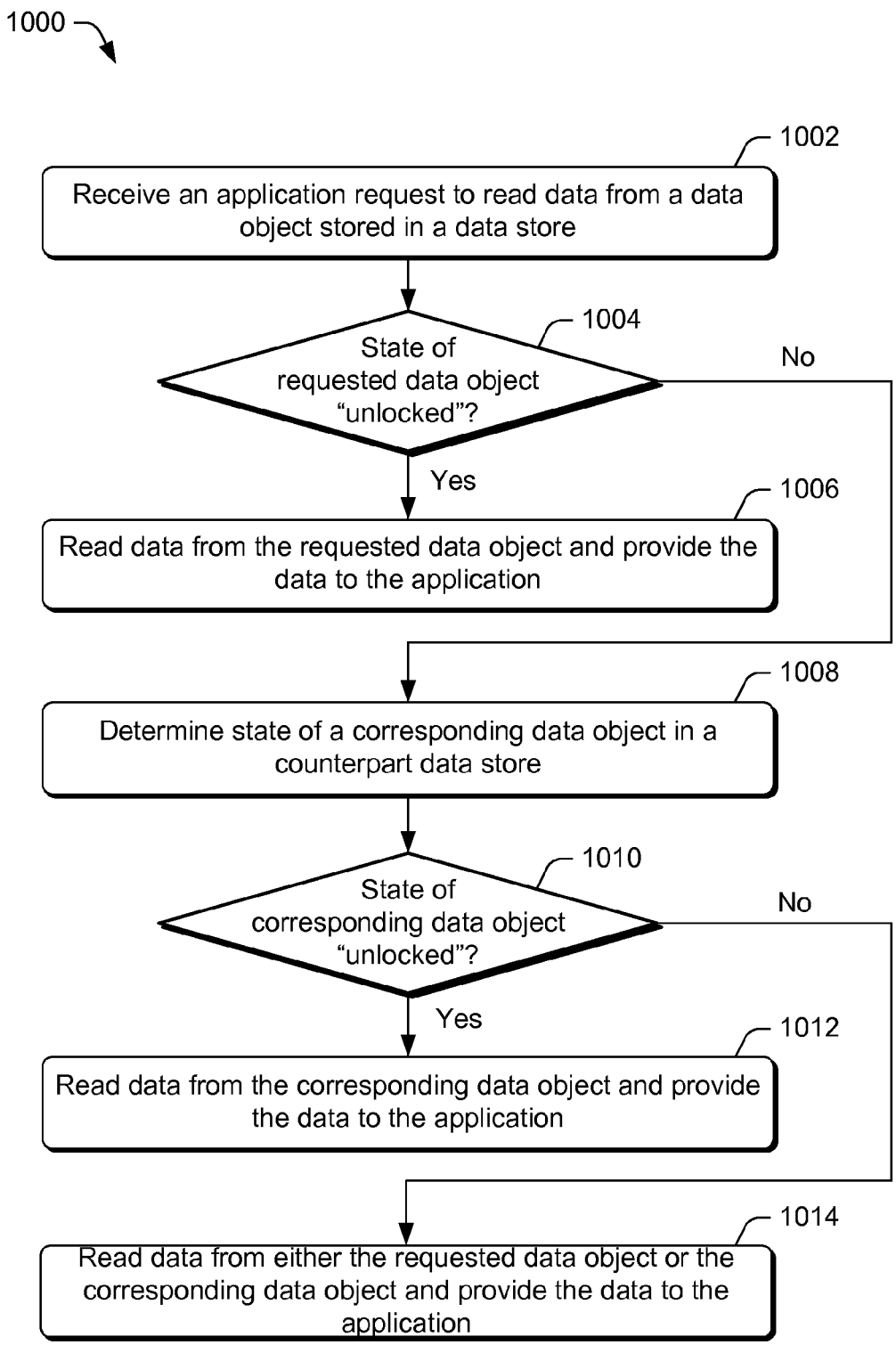
FIG. 10 is a flow diagram of an illustrative process for reading data from a data store of the data storage system during a replication that moves a data object from a source data store to a destination data store.
Figure 11:
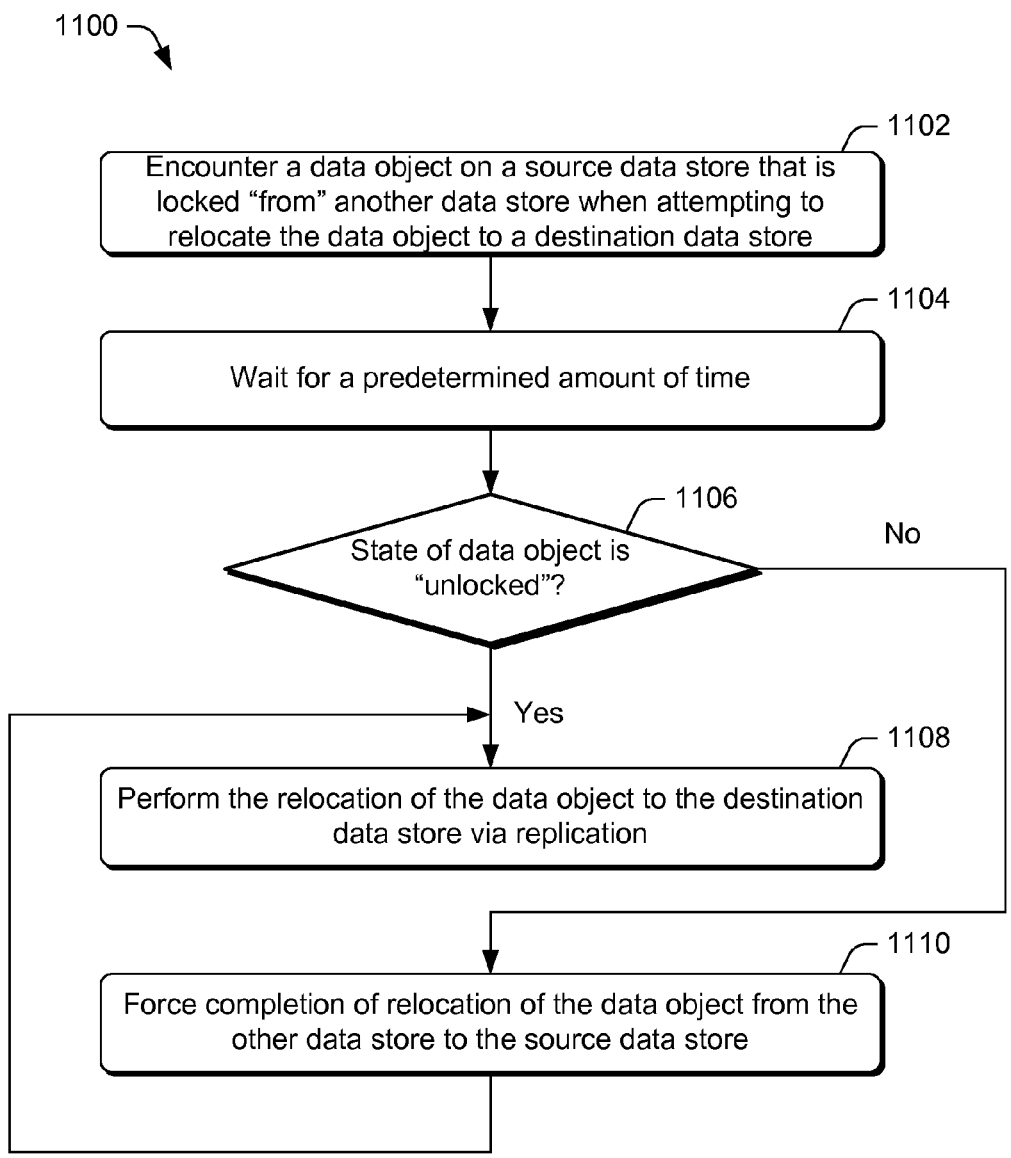
FIG. 11 is a flow diagram of an illustrative process for performing forced retries to recover from a failure during a replication that moves a data object from a source data store to a destination data store.

FIGS. 9-11 show illustrative processes 900-1100 that implement techniques for moving data between data stores without the use of a consistent location service. Each of the processes 900-1100 is illustrated as a collection of blocks in a logical flow graph, which represents a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 800-1100 are described with reference to the computing environment 100 of FIG. 1.

FIG. 9 is a flow diagram of an illustrative process 900 for moving a data object between data stores of a data storage system via data object replication. In some embodiments, the data stores may reside at the same tier level or different tier levels on a tiered data storage system. At block 902, a worker function initiated by the data relocation component 122 may begin the replication by read an original data object with a state of "unlocked" in its state field. In various embodiments, the worker function may accomplish the read by loading the data object into a memory. Further, the worker function may also read a version number of the original data object. The version number may be an incrementally updated value, a globally unique identifier (GUID), a current time, or a Lamport time. The original data object may further include an identifier that uniquely identifies the original data object. However, as described in FIG. 3, if the worker function determines that the original data object is already "locked (to)" another data store that is not the destination data store at block 902, the worker function may be permanently terminated.

At block 904, the worker function may store a duplicate of the "unlocked" data object to a destination data store based on the "unlocked" data object that is read. The duplicate data object may have an identifier that is identical to the identifier of the original data object. The duplicate data object may be provided with a state of "locked (from) (source data store)" in its state field, as well as its own version number. In some embodiments, the worker function may abort the store of the duplicate data object if a data object with the same identifier is already present in the destination data store. In which case, the worker function may abort and retry at the next step in the replication.

At block 906, the worker function may change the state of the original data object to "locked (to) (destination data store)" using optimistic locking. In various embodiments, the optimistic locking may be implemented using the version number read at block 902. Thus, any modification to the original data object, including its corresponding state field, may result in a change in the version number read at block 902. Accordingly, the worker function may only change the state of the original data object if the original data object has not been modified since it was read at block 902. Otherwise, the worker function may abort the change to the state of the original data object, delete the duplicate data object from the destination data store, and retry the replication by once again reading the original data object.

At block 908, the worker function may modify the state of the duplicate data object to "unlocked" using optimistic locking. In various embodiments, optimistic locking may be implemented via a comparison of the version number that the duplicate data object was created with at block 904, and the version number read at the time of the attempt to change the state to "unlocked". In this way, the optimistic locking may prevent conflicts arising from move attempts by other worker functions. For example, the optimistic locking may prevent the worker function from conflicting with another worker function that is also trying to move the original data object from the source data store to the destination data store via replication. At block 910, the worker function may complete the replication by deleting the original data object from the source data store.

In various embodiments, when the worker function fails to complete the data object replication, such as due to optimistic locking or some other type of failure, the worker function may be configured by the data relocation component 122 to infer the step in the replication at which the failure occurred, as well as resume the replication at the next appropriate step until the replication is completed. However, as described above with respect to the scenarios in FIGS. 3, and 5-6, the data relocation component 122 may permanently terminate some retry attempts by the worker function in selective scenarios. Thus, by selectively terminating retry attempts and ensuring that worker functions perform the steps of replication using optimistic locking, the data relocation component 122 may warrant that even when a particular data object is concurrently moved by multiple data object moves to one or more data stores, the particular data object will be not be lost, no multiple duplication of the particular data object will occur, and the particular data object always is moved to one of the data stores.

FIG. 10 is a flow diagram of an illustrative process 1000 for reading data from a data store of the data storage system during a replication that moves a data object from a source data store to a destination data store. In various embodiments, the data stores may be a part of the tiered data storage system 110. At block 1002, the data relocation component 122 may receive an application request to read data from a data object stored in a data store. In some embodiments, the data store may be part of the tiered data storage system 110.

At decision block 1004, the data relocation component 122 may determine whether the state of the requested data object is "unlocked". If the state of the requested data object is "unlocked", ("yes" at decision block 1004), the process 1000 may continue to block 1006. At block 1006, the data relocation component 122 may read the data from the requested data object and provide the read data to the application.

However, if the state of the requested data object is "locked" ("no" at decision block 1004), the process 1000 may proceed to block 1006. At block 1006, the data relocation component 122 may determine that a state of a corresponding data object in a counterpart data store that has the same identifier as the requested data object. The data relocation component 122 may determine the counterpart data store by obtaining the identity of the counterpart data store from a relevant in-progress data object move.

At decision block 1010, the data relocation component 122 may determine whether the state of the corresponding data object is "unlocked". If the state of the corresponding data object is "unlocked", ("yes" at decision block 1010), the process 1000 may continue to block 1012. At block 1012, the data relocation component 122 may read the data from the corresponding data object and provide the read data to the application.

However, if the state of the corresponding data object is "locked" ("no" at decision block 1010), the process 1000 may proceed to block 1014. At block 1014, the data relocation component 122 may read the data from either the requested data object or the corresponding data object and provide the read data to the application.

FIG. 11 is a flow diagram of an illustrative process 1100 for performing forced retries to recover from a failure during a replication that moves a data object from a source data store to a destination data store. In various embodiments, the data stores may be a part of the tiered data storage system 110.

At block 1102, a current worker function that is initiated by the data relocation component 122 may encounter a data object on a source data store that has a state of "locked (from)" a data store that is not a destination data store when attempting to relocate the data object to the destination data store. In various embodiments, such a state of the data object may be the result of the data object being moved by another worker function from some other data store to the source data store in which the other worker function experienced a failure, or a slow replication of the data object by the other worker function from the other data store to the source data store.

At block 1104, the data relocation component 122 may cause the current worker function to wait for a predetermined amount of time for the state of the data object to change to "unlocked". Such a state change may occur if the slow replication is finally completed by the other worker function.

Thus, at decision block 1106, if the data relocation component 122 determines at the end of the predetermined time period that state of the data object is "unlocked", the process 1100 may then proceed to block 1108. At block 1108, the data relocation component 122 may cause the current worker function to perform the relocation of the data object to the destination data store via replication.

However, if the data relocation component 122 determines at the end of the predetermined amount of time that the state of the data object is still not "unlocked", the process 1100 may then proceed to block 1110. At block 1110, the data relocation component may cause the current worker function to take over and complete the failed or otherwise incomplete replication to move the data object from the other data store to the source data store by performing any replication step that remains. For example, if the other worker function stopped at step "3", the worker function 402 may perform step "4" through step "6" to complete the move of the data object from the other data store to the source data store. However, if the other worker function stopped at step "4", the worker function may perform "step "5" and step "6" to complete the move of the data object from the other data store to the source data store. The completion of the replication may change the state of the data object from the state of being "locked (from)" the other data store that is not the destination data store to "unlocked". Subsequently, the process 1100 may loop back to block 1108, at which point the current worker function may perform the relocation of the data object to the destination data store via replication.

In summary, by providing each data object stored in data storage system with an optimistic locking protected state field that includes (1) a locking state; (2) a "to" or "from" state; and (3) a pointer to another data store, the data relocation logics and mechanisms described herein may enable the efficient movement of data objects between data stores without the use of a central consistent location service. Moreover, it will be appreciated that while the data object move via replication is described above with respect to a tiered data storage system, most of the embodiments described above may also be implemented on a non-tiered data storage system.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:
1. A computer-implemented method, comprising:
    under control of one or more computing systems configured with executable instructions,
        reading an original data object with a state of "unlocked" that is stored in a source data store to obtain substantive data, a version number, and an identifier of the original data object;
        storing a duplicate data object of the original data object to a destination data store with a state of "locked from the source data store" when no other data object with the identifier preexists on the destination data store, the duplicate data object being provided with an additional version number;
        changing the state of the original data object to "locked to the destination data store" when the version number of the original data object is unchanged just prior to the changing;
        modifying the state of the duplicate data object to "unlocked" when the additional version number of the duplicate data object is unchanged just prior to the modifying; and
        deleting the original data object from the source data store.

2. The computer-implemented method of claim 1, wherein the source data store and the destination data store are located in different tiers of a tiered data storage system.

3. A computer-implemented method, comprising:
    under control of one or more computing systems configured with executable instructions,
        reading an original data object that is stored in a source data store having a state indicating that the original data object is able to be read from and written to;
        storing, based at least in part on the reading of the original data object, a duplicate data object of the original data object to a destination data store with a state indicating that the duplicate data object is able to be read from but not written to, the state of the duplicate data object further indicating that the duplicate data object is a duplicate from the source data store;
        changing, using optimistic locking, the state of the original data object to indicate that the original data object is able to be read from but not written to and to indicate that the original data object is being duplicated to the destination data store;
        modifying, using optimistic locking, the state of the duplicate data object to indicate that the duplicate data object is able to be read from and written to; and
        deleting the original data object from the source data store.

4. The computer-implemented method of claim 3, wherein the source data store and the destination data store are located in different tiers of a tiered data storage system.

5. The computer-implemented method of claim 3, wherein the original data object includes an identifier, and the storing includes storing the duplicate data object to the destination data store when no other data object with the identifier exists on the destination data store.

6. The computer-implemented method of claim 3, wherein the reading includes reading a version number of the original data object for a first time, and wherein the changing includes reading the version number of the original data object for a second time and changing the state of the original data object when the version number of the original data object at the first time is identical to the version number of the original data object at the second time.

7. The computer-implemented method of claim 6, wherein the version number of the original data object is an incrementally updated value, a globally unique identifier (GUID), a current time, or a Lamport time.

8. The computer-implemented method of claim 3, wherein the storing includes reading a version number of the duplicate data object for a first time, and wherein the modifying includes reading the version number of the duplicate data object for a second time and modifying the state of the duplicate data object when a version time of the duplicate data object at the first time is identical to the version number of the duplicate data object at the second time.

9. The computer-implemented method of claim 8, wherein the version number of the duplicate data object is an incrementally updated value, a globally unique identifier (GUID), a current time, or a Lamport time.

10. The computer-implemented method of claim 3, further comprising repeating performance of the reading and the storing when the changing of the state of the original data object fails due to the optimistic locking.

11. The computer-implemented method of claim 10, further comprising deleting the duplicate data object from the destination data store prior to repeating the performance of the reading and the storing.

12. The computer-implemented method of claim 10, wherein the repeating includes performing the reading and the storing for a second time using exponential back off.

13. The computer-implemented method of claim 3, further comprising altering the state of the original data object from indicating that the original data object is able to be read from but not written to and from indicating that the original data object is being duplicated from another data store and to indicating that the original data object is able to be read from and written to prior to the reading.

14. The computer-implemented method of claim 13, wherein the altering includes altering the state of the original data object when the state does not change in a predetermined time period.

15. The computer-implemented method of claim 3, further comprising providing data from the original data object or the duplicate data object in response to a requesting application when the states of both data objects indicate that the respective data object is able to be read from but not written to.

16. The computer-implemented method of claim 3, further comprising:
receiving a request from an application to read data from the original data object in the source data store; and
providing data from the duplicate data object in the destination data store to the application when the state of the original data object indicates that the original data object is able to be read from but not written to and that the original data object is being duplicated to a the destination data object.

17. The computer-implemented method of claim 3, further comprising:
receiving a request from an application to read data from the duplicate data object in the destination data store; and
providing data from the original data object in the source data store to the application when the state of the duplicate data object indicates that the duplicate data object is able to be read from but not written to and that the duplicate data object is a duplicate from the source data store.

18. One or more non-transitory computer readable media storing computer-executable instructions that, when executed, cause one or more processors to perform acts comprising:
determining a state of an original data object that is stored in a source data store at a start of a replication of the original data object to a destination data store; and
conducting the replication when (1) the state of the original data object indicates that the original data object is able to be read from and written to, and (2) a duplicate data object of the original data object does not exist on the destination data store at the start, the replication comprising:
storing the duplicate data object of the original data object to the destination data store with a state that indicates that the duplicate data object is able to be read from but not written to and that the duplicate data object is being duplicated from the source data store;
changing the state of the original data object to indicate that the original data object is being duplicated to the destination data store using optimistic locking;
modifying the state of the duplicate data object to indicate that the duplicate data object is able to be read from and written to using optimistic locking; and
deleting the original data object from the source data store.

19. The one or more non-transitory computer readable media of claim 18, further comprising instructions that, when executed, cause the one or more processors to perform an act of terminating the replication when (1) the state of the original data object indicates that the original data object is able to be read from but not written to and indicates that the original data object is being duplicated from the destination data store to the source data store, and (2) the duplicate data object does not exist on the destination data store at the start.

20. The one or more non-transitory computer readable media of claim 18, further comprising instructions that, when executed, cause the one or more processors to perform an act of terminating the replication when (1) the state of the original data object indicates that the original data object is able to be read from but not written to and indicates that the original data object is being duplicated to another data store, and (2) the duplicate data object does not exist on the destination data store at the start.

21. The one or more non-transitory computer readable media of claim 18, further comprising instructions that, when executed, cause the one or more processors to perform an act of changing the state of the original data object to indicate that the original data object is able to be read from and written to prior to the conducting when (1) the state of the original data object indicates that the original data object is able to be read from but not written to and that the original data object is being duplicated from another data store, and (2) the duplicate data object does not exist on the destination data store at the start.

22. The one or more non-transitory computer readable media of claim 18, wherein:
the determining includes determining that the state of the original data object indicates that the original data object is able to be read from but not written to and that the original data object is being duplicated to the destination data store;
a state of the duplicate data object indicates that the duplicate data object is able to be read from but not written to and that the duplicate data object is being duplicated to another data store at the start; and
further comprising instructions that, when executed, cause the one or more processors to perform an act of terminating the replication by deleting the original data object from the source data store without storing the duplicate data object to destination data store.

23. The one or more non-transitory computer readable media of claim 18, further comprising instructions that, when executed, cause the one or more processors to perform an act of terminating the replication when the state of the original data object has switched from indicating that the original data object is able to be read from but not written and that the original data object is being replicated to the destination data store to indicating that the original data object is able to be read from and written to prior to the start, and the duplicate data object does not exist on the destination data store at the start.

24. The one or more non-transitory computer readable media of claim 18, wherein the determining includes determining that (1) the state of the original data object indicates that the original data object is able to be read from but not written to and that the original data object is being duplicated to the destination data store and (2) a state of the duplicate data object indicates that the duplicate data object is able to be read from but not written to and that the duplicate data object is being duplicated to the source data store at the start; and further comprising instructions that, when executed, cause the one or more processors to perform acts of:

converting the state of the duplicate data object to indicate that the original data object is able to be read from but not written to and that the duplicate data object is being duplicated from the source data store; and completing the replication by further changing the state of the duplicate data object to indicate that the duplicate data is able to read from and written to and deleting the original data object from the source data store using optimistic locking.

25. The one or more non-transitory computer readable media of claim 18, wherein the determining includes determining that (1) the state of the original data object indicates that the original data object is able to be read from but not written to and that the original data object is being duplicated to the destination data store, and (2) a state of the duplicate data object indicates that the duplicate data object is able to be read from but not written to and that the duplicate data object is being duplicated to the source data store at the start; and further comprising instructions that, when executed, cause the one or more processors to perform acts of:

converting the state of the original data object to indicate that the original data object is able to be read from but not written to and that the original data object is being duplicated from the destination data store; and completing the replication by further changing the state of the original data object to indicate that the original data object is able to be read from and written to and deleting the duplicate data object from the destination data store using optimistic locking.

26. The one or more non-transitory computer readable media of claim 18, wherein the replication is initiated based at least in part on a request from an application or an archival schedule.

27. A system, comprising:
one or more processors; and
a first data store that stores an original data object that includes substantive data and a state field having a locking indicator that indicates accessibility status, a data store pointer, and a duplication indicator that indicates a direction of duplication;
a second data store; and
memory storing components executable by the one or more processors, the components comprising:
a data relocation component to initiate a move of the original data object to the second data store by storing a duplicate data object that includes the same substantive data as the original data object on the second data store.

28. The system of claim 27, wherein the components further comprises a queue component to store a request of the move of the original data object from an application for completion by the data relocation component.

29. The system of claim 28, wherein the queue component is to store the request of the move until the data relocation component informs the queue component that the move is completed.

30. The system of claim 27, wherein the first data store and the second data store are located in different tiers, and wherein the data relocation component is to initiate the move of the original data object based at least in part on a request from an application or an archival schedule of the data relocation component.

31. The system of claim 27, wherein the state field is stored in a column that is associated with the original data object in a database table or one of a prefix or suffix data stored within the original data object.

32. The system of claim 27, wherein the duplicate data object includes an additional state field having at least one of an additional locking indicator, an additional data store pointer that points to the first data store or another data store, or an additional duplication indicator.

33. The system of claim 32, wherein the data relocation component is to store the duplicate data object to the second data store such that information in the additional state field includes a locking indicator that indicates that the duplicate data object is able to be read from but not written to and that the duplicate data object is being duplicated from the first data store.

34. The system of claim 32, wherein the duplicate data object and the additional state field are protected by optimistic locking, and wherein the data relocation component is to further (1) change the additional locking indicator from indicating that the duplication data object is able to be read from but not written to into indicating that the duplicate object is able to be read from and written to; and (2) delete the additional data store pointer that points to the first data store and the additional duplication indicator that indicates the data object is duplicated from the first data store.

35. The system of claim 32, wherein the data relocation component is to complete the move of the original data object to the second data store by deleting the original data object from the first data store when the locking indicator indicates that the original data object is able to be read from but not written to, the duplication indicator indicates that the original data object is being duplicated to the second data store, and the additional state field of the duplicate data object includes a locking indicator that indicates that the duplicate data object is able to be read from and written to.

36. The system of claim 27, wherein the original data object further includes an identifier, and wherein the data relocation component is to store the duplicate data object on the second data store when no data object with the identifier preexists on the second data store.

37. The system of claim 27, wherein the original data object and the state field are protected by optimistic locking, and wherein the data relocation component is to further, using optimistic locking (1) change the locking indicator from indicating that the original data object is able to be written to and read from to indicating that the original data object is able to be read from but not written to; (2) change the data store pointer to point to the second data store; and (3) change the duplication indicator to indicate that the original data object is being duplicated to the second data store.

* * * * *